United States Patent
Alonso-Rubio et al.

(10) Patent No.: US 10,070,365 B2
(45) Date of Patent: Sep. 4, 2018

(54) MEASUREMENTS ON LTE FOR CSFB RAT PRIORITIZATION

(71) Applicant: Telefonaktiebolaget LM Ericsson (publ), Stockholm (SE)

(72) Inventors: Jose Alonso-Rubio, Solna (SE); Carlos Manuel Gomez, Madrid (ES); Eric Parsons, Ottawa (CA)

(73) Assignee: Telefonaktiebolget L M Ericsson (publ), Stockholm (SE)

( * ) Notice: Subject to any disclaimer, the term of this patent is extended or adjusted under 35 U.S.C. 154(b) by 183 days.

(21) Appl. No.: 15/034,379

(22) PCT Filed: Nov. 7, 2013

(86) PCT No.: PCT/SE2013/051309
§ 371 (c)(1),
(2) Date: May 4, 2016

(87) PCT Pub. No.: WO2015/069158
PCT Pub. Date: May 14, 2015

(65) Prior Publication Data
US 2016/0295489 A1    Oct. 6, 2016

(51) Int. Cl.
*H04W 36/30* (2009.01)
*H04W 36/00* (2009.01)
(Continued)

(52) U.S. Cl.
CPC ............ *H04W 36/30* (2013.01); *H04L 5/006* (2013.01); *H04L 43/16* (2013.01); *H04W 24/06* (2013.01);
(Continued)

(58) Field of Classification Search
CPC . H04W 36/28; H04W 84/12; H04W 36/0055; H04W 36/22; H04W 36/14;
(Continued)

(56) References Cited

U.S. PATENT DOCUMENTS

| 2009/0059861 A1 | 3/2009 | Gunnarsson et al. |
| 2010/0087197 A1* | 4/2010 | Iwamura ............. H04J 11/0086 455/436 |

(Continued)

FOREIGN PATENT DOCUMENTS

| CN | 103348731 A | 10/2013 |
| EP | 2 925 081 A1 | 9/2015 |

(Continued)

OTHER PUBLICATIONS

EP 13 897 127.0 (PCT/SE2013/051309, Extended European Search Report, dated Apr. 19, 2017, 12 pages.
(Continued)

*Primary Examiner* — Jung Liu
(74) *Attorney, Agent, or Firm* — Sage Patent Group (57) ABSTRACT

The present invention relates to methods at a base station of changing Radio Access Technology (RAT) of a mobile terminal in a communications network, and related base stations performing the methods. In one embodiment, a change to be made from a serving RAT to a first target RAT is determined, and a quality measure of the first target RAT is estimated based on a quality measure of the serving RAT. The mobile terminal is instructed to change to the first target RAT responsive to determining that the estimated signal quality measure of the first target RAT exceeds a quality threshold value.

8 Claims, 7 Drawing Sheets

(51) Int. Cl.
  *H04L 5/00* (2006.01)
  *H04L 12/26* (2006.01)
  *H04W 24/06* (2009.01)
  *H04W 88/10* (2009.01)

(52) U.S. Cl.
  CPC ........ *H04W 36/0022* (2013.01); *H04W 88/10* (2013.01)

(58) Field of Classification Search
  CPC . H04W 36/30; H04W 56/00; H04W 36/0088; H04W 76/025; H04W 84/042; H04W 40/248; H04W 88/06; H04W 76/04; H04W 76/026; H04W 72/0453; H04J 11/0086
  See application file for complete search history.

(56) References Cited

U.S. PATENT DOCUMENTS

| | | | |
|---|---|---|---|
| 2010/0316000 A1 | 12/2010 | Burbidge et al. | |
| 2012/0270545 A1* | 10/2012 | Zhao | H04W 72/00 455/435.1 |
| 2013/0150054 A1 | 6/2013 | Axmon et al. | |
| 2013/0301466 A1* | 11/2013 | Nenner | H04W 36/0022 370/252 |
| 2015/0092708 A1* | 4/2015 | Su | H04W 76/16 370/329 |
| 2016/0021581 A1* | 1/2016 | Deenoo | H04W 48/16 370/331 |
| 2016/0029282 A1* | 1/2016 | Lee | H04W 36/14 370/332 |

FOREIGN PATENT DOCUMENTS

| | | |
|---|---|---|
| WO | WO 2012/087359 A1 | 6/2012 |
| WO | WO 2012/162673 A2 | 11/2012 |

OTHER PUBLICATIONS

"Technical Specification Group Services and System Aspects; Circuit Switched (CS) Fallback in Evolved Packet System (EPS); Stage 2 (Release 12)," (Draft) 3GPP TS 23.272 V12.0.ORM (Oct. 2, 2013), 99 pages.

International Search Report and Written Opinion of the International Searching Authority, Application No. PCT/SE2013/051309, dated Jul. 16, 2014.

* cited by examiner

MEASUREMENTS ON LTE FOR CSFB RAT PRIORITIZATION

CROSS REFERENCE TO RELATED APPLICATION

This application is a 35 U.S.C. § 371 national stage application of PCT International Application No. PCT/SE2013/051309, filed on Nov. 7, 2013, the disclosure and content of which is incorporated by reference herein in its entirety. The above-referenced PCT International Application was published in the English language as International Publication No. WO 2015/069158 A1 on May 14, 2015.

TECHNICAL FIELD

The present invention relates to a method at a base station of changing Radio Access Technology, RAT, of a mobile terminal in a communications network, and a base station performing the method. The present invention further relates to a computer programs performing the method according to the present invention, and a computer program product comprising computer readable medium having the computer program embodied therein.

BACKGROUND

Figure 1:
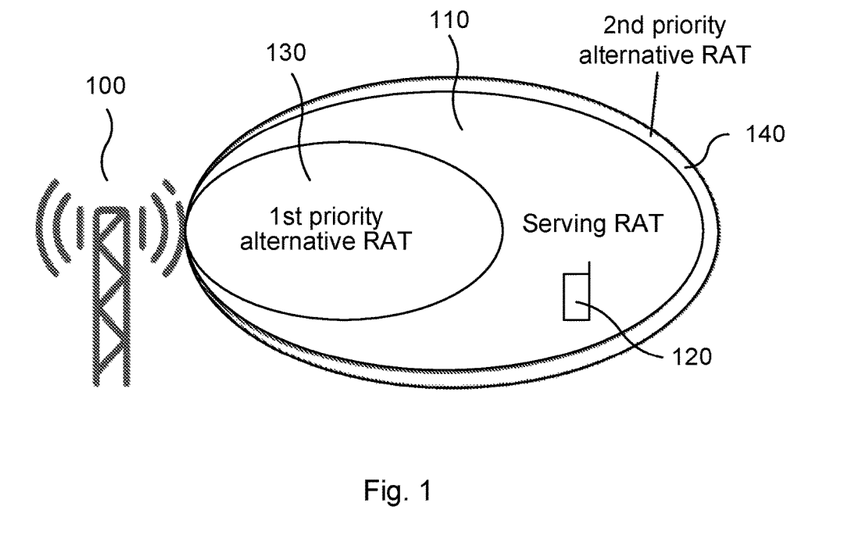
FIG. 1 illustrates coverage of serving and alternative RATs.

In the art, when a mobile terminal, such as a user equipment (UE), receives/transmits a voice call while attached to a Long Term Evolution (LTE) network in which voice service is not provided according to the underlying Radio Access Technology (RAT), the UE is commanded to fall back into an alternative RAT where the service is provided. Modern UEs, such as smart phones are generally capable of handling a plurality of different RATs, such as e.g. Bluetooth, Wi-Fi, 2G, 3G or 4G. Thus, there may be more than one alternative RAT where the service is provided, and typically one of them is the preferred alternative, e.g. a first system implementing Wideband Code Division Multiple Access (WCDMA) and a second system being Global System for Communication (GSM) where WCDMA is the first priority alternative RAT). A simplified coverage illustration of serving and alternative RATs is shown in FIG. 1. Thus, a base station 100 such as a base transceiver station (BTS) in case of GSM, a NodeB in case of Universal Mobile Telecommunications System (UMTS) or an eNodeB in case of LTE has certain coverage, where the serving RAT 110 is the current RAT servicing a UE 12 connected to the base station. From time to time, it may be necessary for a UE to change to an alternative RAT in case a particular service cannot be delivered by the serving RAT. Traditionally, this process has been done blindly at the base station 100, i.e. there is no information available about the signal quality of the alternative RATs 130, 140, and the changing from one RAT to another typically has taken tens of seconds. If the 1st priority alternative, or first target, RAT 130 has a good signal quality, the UE 120 will successfully attach and will be able to set up the call, as shown in FIG. 2.

Figure 2:
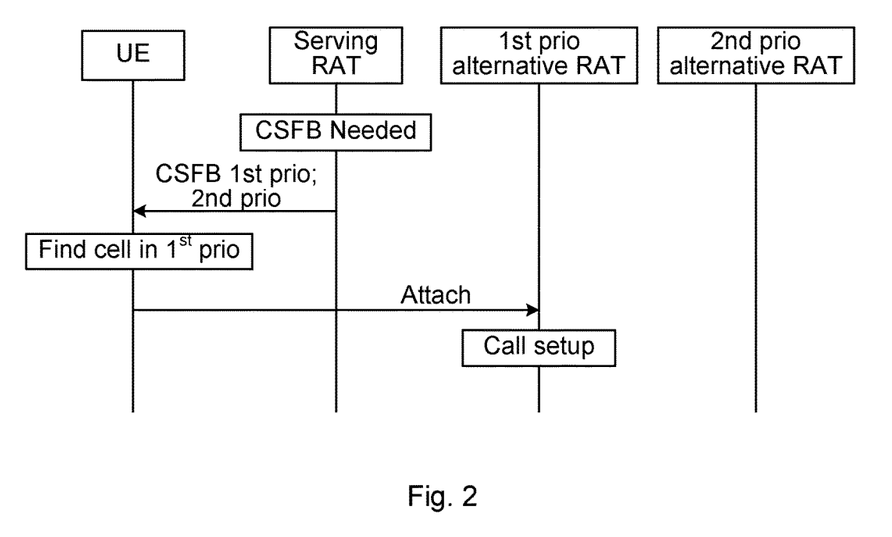
FIG. 2 illustrates a prior art approach of changing RAT of a mobile terminal.

Thus, in FIG. 2, the base station of the serving RAT determines whether a RAT change is to be undertaken on the basis of a service requested by the UE. Practically, the base station of the serving RAT may determine that a so called Circuit Switched Fall Back (CSFB) is to be undertaken, i.e. a method used for delivering voice services and/or Short Message Services (SMS) to LTE devices through the use of GSM or another circuit-switched network, since LTE—being a packet-based network—cannot support circuit-switched calls. The UE will hence fall back on a 3G or 2G network to complete the call or to deliver the SMS text message. The base station thus determines that a change of RAT must be made, i.e. the services requested by the UE (such as e.g. voice calls or SMS in LTE) cannot be provided for in the serving RAT, and sends to the UE an instruction to either change to a 1st priority alternative RAT or a 2nd priority alternative RAT. Thus, the UE tries to find a cell in the 1st priority alternative RAT, and if it is successful, i.e. if the quality is good enough, the UE will initiate an Attach process and subsequently set-up a call with the 1st priority alternative RAT.

Figure 3:
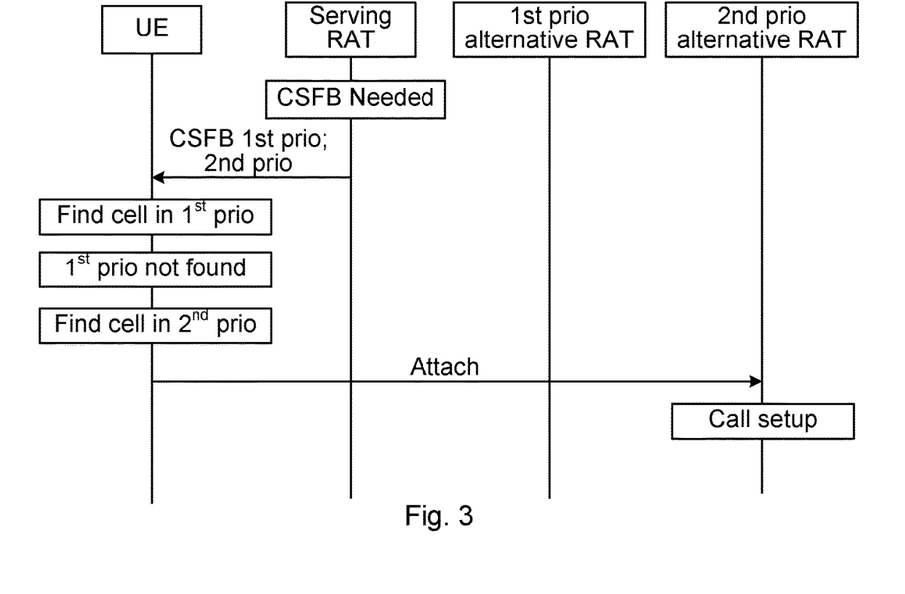
FIG. 3 illustrates a further prior art approach of changing RAT of a mobile terminal.

With reference to FIG. 3, if the signal quality of the 1st priority RAT, i.e. the first target RAT, is not considered sufficiently good, the UE will still try to access that RAT for a certain period of time (specified by the UE manufacturer) until it decides to try and find a cell in the 2nd priority alternative RAT, i.e. the second target RAT, where it eventually may set up the call (if the signal quality is considered good enough). This will make the process of changing RATs long (up to 30 seconds in practical implementations), thus resulting in inferior accessibility and user perception of the network. This situation happens often in networks where LTE coverage is better than the 1st priority alternative RAT due to deployment frequencies, e.g. at sites where LTE is deployed in a 800 MHz band and UMTS is deployed in a 2100 MHz band.

Figure 4:
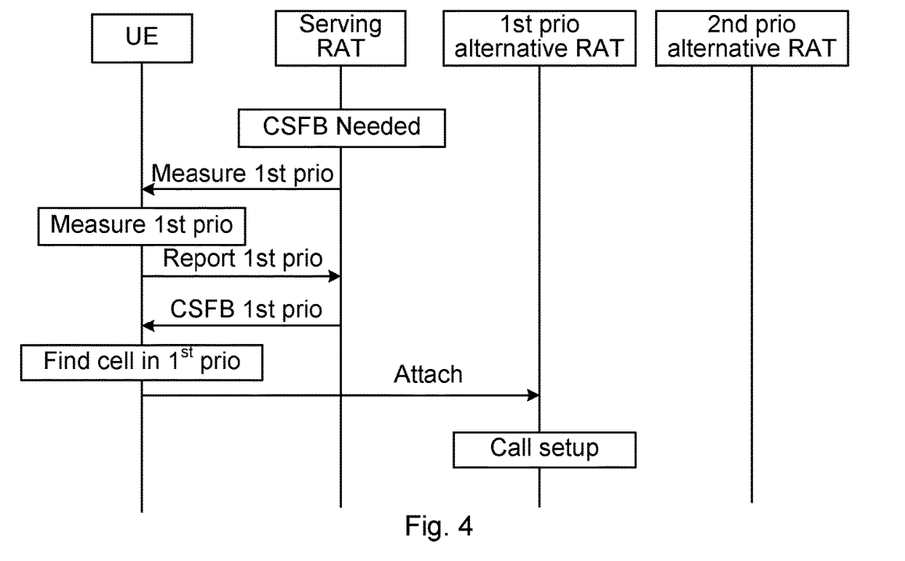
FIG. 4 illustrates still a further prior art approach of changing RAT of a mobile terminal.

With reference to FIG. 4, some network providers try to mitigate this by having the base station of the serving RAT commanding the UE to measure signal quality of the 1st priority alternative RAT prior to CSFB release, making sure that the alternative RAT only is measured if the signal quality is good enough. Thus, the base station commands the UE to measure the signal quality of the 1st priority alternative RAT prior to determining whether a RAT change is necessary, the measures the quality of the 1st priority alternative RAT and reports back to the base station of the serving RAT. When an CSFB is to be performed, the serving RAT is aware of the (high) quality of the 1st priority alternative RAT and sends an instruction to change to that RAT accordingly. The UE thus finds a cell in the 1st priority alternative RAT and initiates an Attach process and a call is subsequently setup with the 1st priority alternative RAT.

Figure 5:
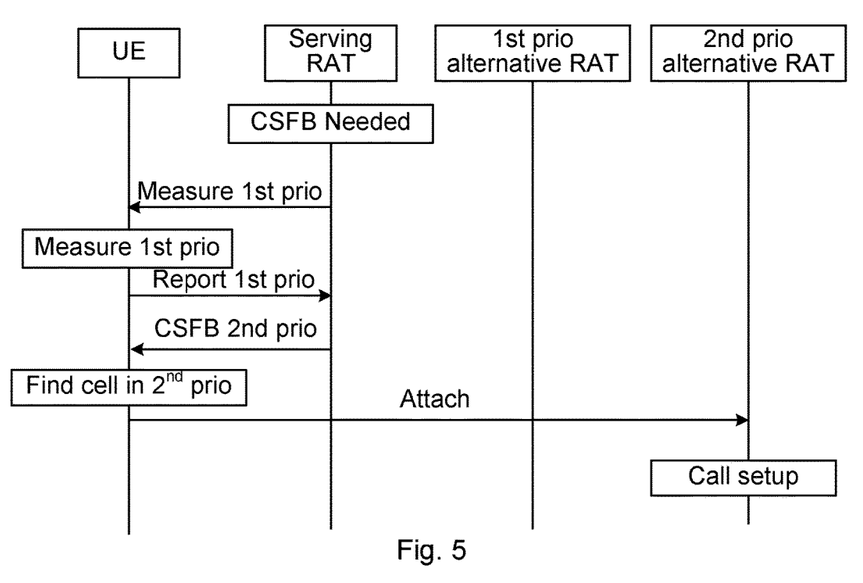
FIG. 5 illustrates yet a further prior art approach of changing RAT of a mobile terminal.

However, with reference to FIG. 5, should the quality of the 1st priority serving RAT not be sufficient, a report is accordingly sent from the UE to the base station, wherein the base station instructs the UE to find a cell in the 2nd priority alternative RAT. If the quality of the 2nd priority alternative RAT is good enough, a call is setup. Commanding the UE to measure signal quality of other RATs prior to CSFB adds at least 2-3 seconds to the call setup time and only works with UEs which support Packet Switched Handover (PSHO) to the RAT in question.

SUMMARY

An object of the present invention is to solve, or at least mitigate, one or more of these problems in the art and to provide an improved method and device for changing RAT of a mobile terminal in a communications network.

This object is attained in a first aspect of the present invention by a method at a base station of changing RAT of a mobile terminal in a communications network. The method comprises the steps of determining that a change is to be made from a serving RAT to a first target RAT, estimating a quality measure of the first target RAT based on a quality measure of the serving RAT, and instructing the mobile terminal to change to the first target RAT if the estimated signal quality measure of the first target RAT exceeds a quality threshold value.

This object is attained in a second aspect of the present invention by a base station for changing RAT of a mobile terminal in a communications network. The base station comprises a processing unit and a memory, which memory contains instructions executable by the processing unit, whereby the base station is operative to determine that a change is to be made from a serving RAT to a first target RAT, to estimate a quality measure of the first target RAT based on a quality measure of the serving RAT, and to instruct the mobile terminal to change to the first target RAT if the estimated signal quality measure of the first target RAT exceeds a quality threshold value.

Advantageously, by estimating a quality measure of a first target RAT to which to change from the serving RAT based on a corresponding quality measure of the serving RAT, such as e.g. a Channel Quality Indicator (CQI), measured signal strength (i.e. power of a received signal is measured), signal-to-interference-plus-noise ratio (SINR) or any other appropriate measure, the setup time of for instance a voice call or SMS (or any other service which cannot be provided for in the serving RAT) in the first target RAT can be reduced. As has been discussed with reference to prior art, CSFB (Circuit Switched Fall Back) from LTE to e.g. GSM or UMTS takes a long time to perform.

In an embodiment of the present invention, the base station instructs the mobile terminal to change to a second target RAT if the estimated quality measure does not exceed the quality threshold value. Thus, if the quality measure of the intended RAT, i.e. the first RAT, is not considered good enough, the mobile terminal is instructed to switch to a second target RAT. As has been discussed with reference to prior art, the CSFB process from LTE to GSM or UMTs takes very long time when the UE has to search for more than one alternative, target RAT. In some cases, call setup time exceeds 30 seconds, which is highly undesired from a user perception point of view.

In another embodiment of the present invention, the estimation of the signal quality measure of the first target RAT on the basis of a quality measure of the serving RAT is performed by considering a cell of the first target RAT to which the mobile terminal is to change to be co-located with a serving cell of the serving RAT. Thus, it is assumed that the first target cell (e.g UMTS) and the serving cell (LTE) are co-located, i.e. that the antenna of the respective cell is in the same physical location, in which case it further can be assumed that LTE is better than UMTS in terms of signal quality measured in the form of e.g. CQI, measured signal strength, SINR, etc. Typically, there is a known relationship between the serving cell and the first target cell, for instance that the signal strength in LTE always is x dB better than that in UMTS, where x is a fixed number known in advance. This is the case in countries where LTE is deployed in the 800 MHz band and UMTS is deployed in the 2100 MHz band). With these assumptions, coverage of UMTS can advantageously be estimated from the measurements already present in LTE, and therefore a decision can be taken be a base station in the form of e.g. an eNodeB to change RAT and hence transfer the UE to UMTS (in case of good UMTS coverage) or to GSM (in case of bad UMTS coverage) without wasting time on performing additional measurements specific to UMTS, i.e. without measuring signal quality of the first target RAT.

Further provided is a computer program performing the method according to the present invention, and a computer program product comprising computer readable medium having the computer program embodied therein.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 illustrates coverage of serving and alternative RATs as previously has been discussed.

FIGS. 2-5 illustrate prior art approaches of changing RAT of a mobile terminal as previously has been discussed.

Figure 6:
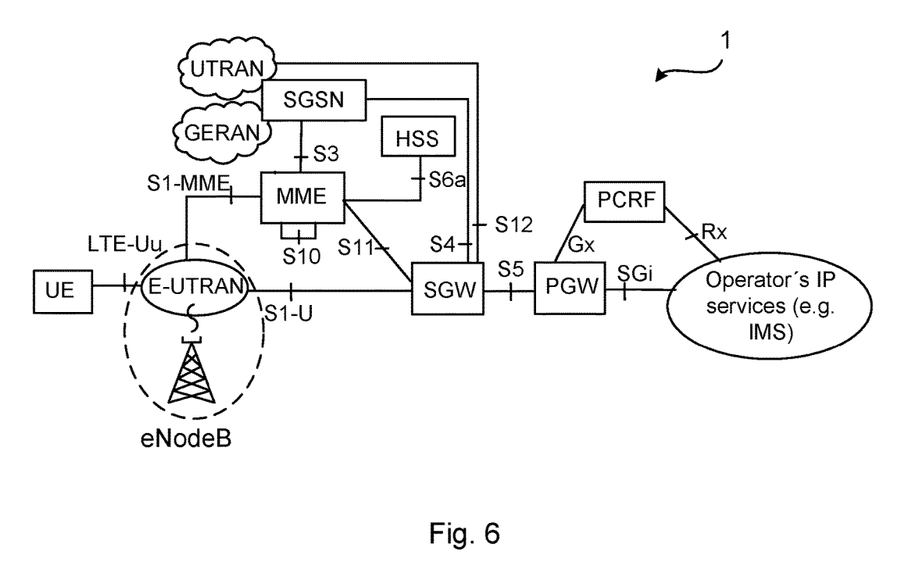
FIG. 6 shows a schematic overview of an exemplifying wireless communication system in which the present application can be implemented.

FIG. 6 shows a schematic overview of an exemplifying wireless communication system 1 in which the present application can be implemented. The wireless communication system 1 is an LTE based system. The terms "LTE" and "LTE based" system is used to comprise both present and future LTE based systems, such as, for example, advanced LTE systems. It should be noted that although FIG. 6 shows a wireless communication system 1 in the form of an LTE based system, the example embodiments herein may also be utilized in connection with other wireless communication systems, such as e.g. GSM or UMTS as previously mentioned, comprising nodes and functions that correspond to the nodes and functions of the system in FIG. 6.

The wireless communication system 1 comprises a base station in the form of an eNodeB, operatively connected to an SGW, in turn operatively connected to an MME and a PGW, which in turn is operatively connected to a PCRF.

The eNodeB is a radio access node that interfaces with a mobile radio terminal, i.e. a UE. The eNodeBs of the system form the radio access network E-UTRAN for LTE communicating with the UEs over an air interface such as LTE-Uu. The SGW routes and forwards user data packets over S1-U, whilst also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the DL data path and triggers paging when DL data arrives for the UE, and further manages and stores UE contexts, e.g. parameters of the IP bearer service, network internal routing information. It also performs replication of the user traffic in case of lawful interception. The SGW communicates with the MME via interface S11 and with the PGW via S5. Further, the SGW may communicate with the UMTS radio access network UTRAN and with the GSM EDGE Radio Access Network (GERAN) via S12.

The MME is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user by interacting with the Home Subscriber Server (HSS). The Non-Access Stratum (NAS) signaling terminates at the MME and it is also responsible for generation and allocation of temporary identities to UEs via S1-MME. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

Further, there is an interface S10 configured for communication between MMEs for MME relocation and MME-to-MME information transfer.

The PGW provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1X and EvDO). The interface between the PGW and the packet data network is referred to as the SGi. The packet data network may be an operator external public or private packet data network or an intra operator packet data network, e.g. for provision IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

Figure 7:
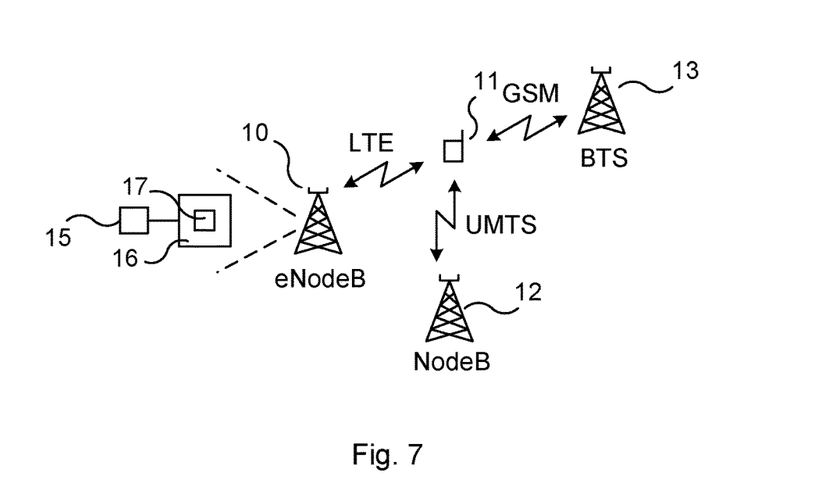
FIG. 7 illustrates a device for changing RAT of a mobile terminal in a communications network according to an embodiment of the present invention.

FIG. 7 illustrates a device 10 for changing RAT of a UE 11 in a communications network according to an embodiment of the present invention. The device 10 is embodied in the form of an eNodeB using LTE as RAT. Hence, in the exemplifying embodiment in FIG. 7, the serving RAT is LTE. In practice, the changing of RAT at the eNodeB 10 is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc.

Figure 8:
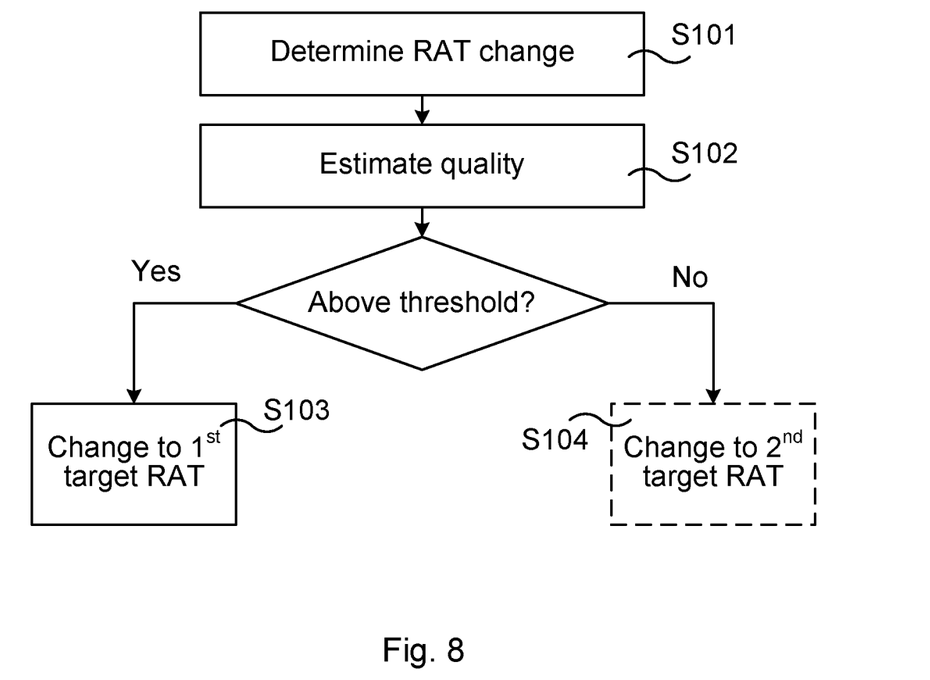
FIG. 8 illustrates a flowchart of a method of changing RAT of a mobile terminal in a communications network according to an embodiment of the present invention.

Now, in order to advantageously reduce setup time of for instance a voice call or SMS (or any other service which cannot be provided for in the serving RAT) in a first target RAT as previously has been discussed, an embodiment of a method according to the present invention is proposed, a flowchart of which is shown in FIG. 8. Reference is further made to FIG. 7. In step S101, the processing unit 15 of the eNodeB 10 determines that a change is to be made from a serving RAT to a first target RAT. For instance, the UE 11 may request a voice call to be setup, which the serving RAT (being LTE) cannot establish. In step S102, the processing unit 15 of the eNodeB 10 estimates a (signal) quality measure of the first target RAT, being e.g. UMTS handled by NodeB 12, based on a quality measure of the serving RAT. It should be noted that the quality measure of the serving RAT already may have been reported to the eNodeB 10 from the UE 11 prior to the eNodeB 10 determining that a RAT change is to be effected. This may be done repeatedly by the UE 11 by continuously providing the eNodeB 10 with CQI reports. In step S103, if the estimated signal quality measure of the first target RAT exceeds a quality threshold value, the eNodeB 10 instructs the mobile terminal to change to the first target RAT if the estimated signal quality measure of the first target RAT exceeds a quality threshold value. Optionally, in case the estimated signal quality of the first target RAT does not exceed the quality threshold value, the UE11 is instructed in step S104 to change to a second target RAT, in the form of GSM handled by BTS13.

In an embodiment of the present invention, by assuming that the cells belonging to LTE (i.e. the serving RAT) and the first target RAT are co-located, it is possible to estimate the signal quality on the first target RAT by applying an offset to the measurements performed in LTE. Advantageously, the signal quality in the serving RAT is already known to the LTE network (by having the UE 11 report CQI or submit other appropriate measurement reports) to the eNodeB 10 and therefore no additional time is required to complete voice call setup. Thus, the estimation of the signal quality measure of the first target RAT of the eNodeB 10 on the basis of a quality measure of the serving RAT of the NodeB 12 is performed by considering a cell of the first target RAT to which the UE 11 is to change to be co-located with a serving cell of the serving RAT. Thus, it is assumed that the target cell (in UMTS) and the serving cell (in LTE) are co-located, i.e. that the antenna of the respective cell is in the same physical location, in which case it further can be assumed that LTE is better than UMTS in terms of signal quality according to a known relationship as previously has been discussed. This is the case in countries where LTE is deployed in the 800 MHz band and UMTS is deployed in the 2100 MHz band). With these assumptions, coverage of UMTS can advantageously be estimated from the measurements already present in LTE, and therefore a decision can be taken be a base station in the form of e.g. an eNodeB to change RAT and hence transfer the UE to UMTS (in case of good UMTS coverage) or to GSM (in case of bad UMTS coverage) without wasting time on performing additional measurements specific to UMTS, i.e. without measuring signal quality of the first target RAT.

Figure 9:
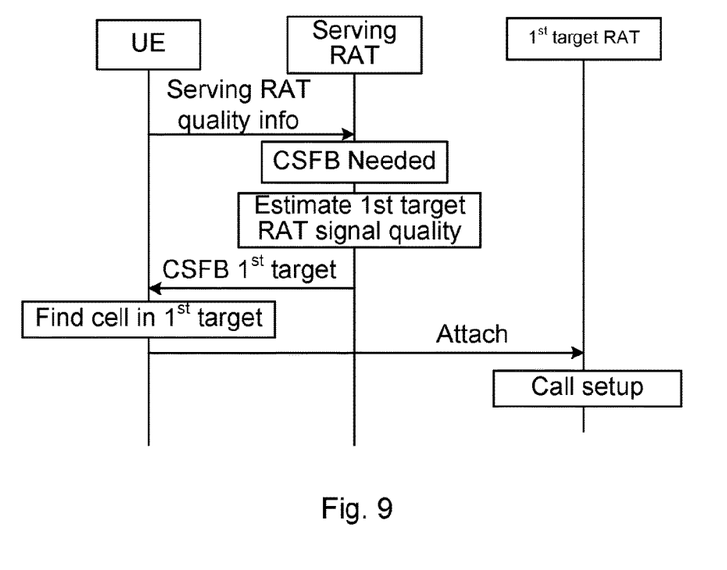
FIG. 9 illustrates changing RAT of a mobile terminal in a communications network according to an embodiment of the present invention.

This is illustrated in FIG. 9, where the UE repeatedly serves the eNodeB of the serving RAT with measurement reports regarding signal quality in the serving RAT (in the form of e.g. CQI). The eNodeB of the serving RAT determines that a CSFB is needed and thus estimates signal quality of the first target RAT based on e.g. the CQI of the serving RAT. If the CQI is good enough, the eNodeB of the serving RAT instructs the UE to perform a CSFB, wherein the UE finds a cell in the first target RAT, an Attach process is undertaken and a call is setup with the NodeB of the first target RAT.

Figure 10:
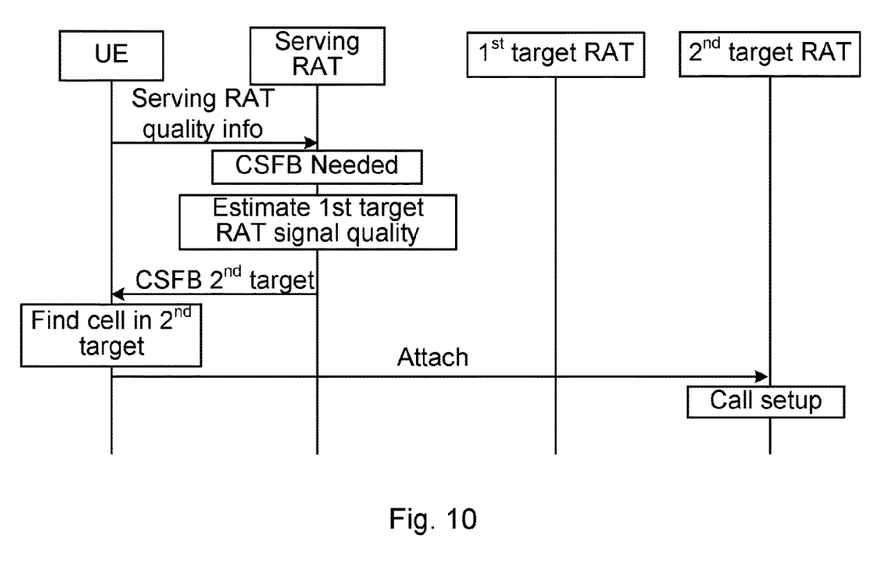
FIG. 10 illustrates changing RAT of a mobile terminal in a communications network according to another embodiment of the present invention.

Further, as is illustrated in FIG. 10, where the UE again repeatedly serves the eNodeB of the serving RAT with measurement reports regarding signal quality in the serving RAT (in the form of e.g. CQI, measured signal strength or SINR). The eNodeB of the serving RAT determines that a CSFB is needed and thus estimates signal quality of the first target RAT based on e.g. the CQI of the serving RAT. If the CQI is not good enough, the eNodeB of the serving RAT will instruct the UE to perform a CSFB, however not to the first target RAT, but to a second target RAT wherein the UE finds a cell in the second target RAT, an Attach process is undertaken and a call is setup with the BTS of the second target RAT.

In a further embodiment of the present invention, the estimation of the signal quality of the first target RAT on the basis of the signal quality of the serving RAT is performed by applying an offset to the measured signal quality on the serving RAT (i.e. LTE). The offset value depends on the difference between operating frequencies of both RATs and the difference in transmission power between the RATs:

$S_{TARGET} = S_{SERVING} - \text{Offset}$, where

Offset=f(f1, f2, P1, P2).

Where f1 is the operating frequency of the serving RAT, f2 is the operating frequency of the first target RAT, P1 is the transmission power of the serving cell in the serving RAT and P2 is the transmission power of the co-located cell in the first target RAT.

In a further embodiment of the present invention, the offset could be expressed as:

Offset=f(f1, f2, P1, P2, A1, A2).

That is, further elements accounting for path loss have been considered. A1 accounts for elements affecting the path loss such as antenna gain or feeder loss of the serving RAT; A2 accounts for elements affecting the path loss such as antenna gain or feeder loss of the first target RAT. It can be envisaged that any other relevant parameters which could affect the measured quality or signal strengths in the source and target RATs are included in the function f.

Only if $S_{TARGET}$ is above a quality threshold will the eNodeB in the LTE network command the UE to perform CSFB to the NodeB in the UMTS network. In case the signal quality of UMTS is not good enough, the eNodeB will command the UE to perform CSFB to the BTS in the GSM network.

Figure 11:
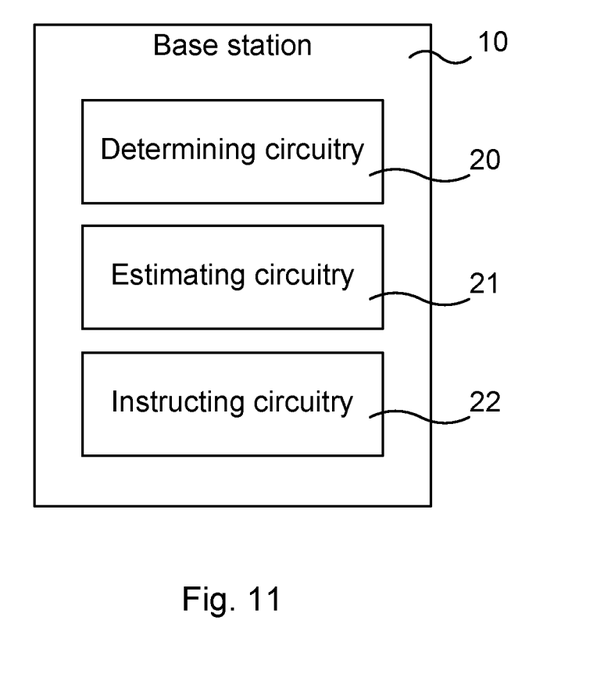
FIG. 11 shows a device for changing RAT of a mobile terminal in a communications network in accordance with an embodiment of the present invention.

FIG. 11 shows a device for changing RAT of a mobile terminal in a communications network, the device being a base station such as a BTS, a NodeB or an eNodeB, in accordance with an embodiment of the present invention. The device 10 comprises determining circuitry 20 adapted to determine that a change is to be made from a serving RAT to a first target RAT, estimating circuitry 21 adapted to estimate a quality measure of the first target RAT based on a quality measure of the serving RAT, and instructing circuitry 22 adapted to instruct the mobile terminal to change to the first target RAT if the estimated signal quality measure of the first target RAT exceeds a quality threshold value. The determining circuitry 20 and the instructing circuitry 21 may comprise a communications interface for receiving/sending information. The base station 10 may further comprise a local storage. The determining circuitry 20, estimating circuitry 21 and instructing circuitry 22 may (in analogy with the description given in connection to FIG. 7) be implemented by a processor embodied in the form of one or more microprocessors arranged to execute a computer program downloaded to a suitable storage medium associated with the microprocessor, such as a RAM, a Flash memory or a hard disk drive. The determining circuitry 20 and the instructing circuitry 21 may comprise one or more transmitters and/or receivers and/or transceivers (even combining the receiving circuitry and the forwarding circuitry in the same unit), comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method at a base station of changing Radio Access Technology (RAT) of a mobile terminal in a communications network, comprising:
   receiving a signal quality measure of a serving RAT from the mobile terminal, wherein said signal quality measure of the serving RAT comprises a Channel Quality Indicator, CQI, a signal strength measure, a signal-to-interference-plus-noise ratio, SINR, or a quality measurement report of the serving RAT;
   determining that a change is to be made from the serving RAT to a first target RAT to provide a circuit switched fallback (CSFB) service;

estimating a signal quality measure of the first target RAT based on the received signal quality measure of the serving RAT, wherein the estimation of the signal quality measure of the first target RAT is calculated as a function of the signal quality measure of the serving RAT and an offset function based on operating frequency of the serving RAT, transmission power of the serving cell in the serving RAT, operating frequency of the first target RAT, transmission power of the target cell in the first target RAT;

instructing the mobile terminal to change to the first target RAT responsive to determining that the estimated signal quality measure of the first target RAT exceeds a quality threshold value; and instructing the mobile terminal to change to a second target RAT responsive to determining that the estimated quality measure of the first target RAT does not exceed the quality threshold value.

2. The method according to claim 1, wherein the estimation of the signal quality measure of the first target RAT on the basis of the signal quality measure of the serving RAT is performed by:

considering a target cell of the first target RAT to which the mobile terminal is to change to be co-located with the serving cell of the serving RAT, based on the channel quality indicator (CQI) of the serving RAT being better than the target cell of the first target RAT.

3. The method according to claim 1, wherein included in said offset function is further a path loss of the serving cell in the serving RAT, and a path loss of the target cell in the first target RAT.

4. A base station for changing Radio Access Technology (RAT) of a mobile terminal in a communications network, the base station comprising a processing unit and a memory, said memory containing instructions executable by said processing unit, whereby said base station is configured to:

receive a quality measure of a serving RAT from the mobile terminal, wherein said quality measure of the serving RAT comprising a Channel Quality Indicator, CQI, a signal strength measure, a signal-to-interference-plus-noise ratio, SINR, or a quality measurement report of the serving RAT;

determine that a change is to be made from the serving RAT to a first target RAT based on the received quality signal measure of the serving RAT;

estimate a quality measure of the first target RAT based on a quality measure of the serving RAT, wherein the estimation of the signal quality measure of the first target RAT is calculated as a function of the signal quality measure of the serving RAT and an offset function based on operating frequency of the serving RAT, transmission power of the serving cell in the serving RAT, operating frequency of the first target RAT, transmission power of the target cell in the first target RAT;

instruct the mobile terminal to change to the first target RAT responsive to determining that the estimated signal quality measure of the first target RAT exceeds a quality threshold value; and instruct the mobile terminal to change to a second target RAT responsive to determining that the estimated quality measure does not exceed the quality threshold value.

5. The base station according to claim 4, wherein the estimation of the signal quality measure of the first target RAT on the basis of a quality measure of the serving RAT is performed by:

considering a target cell of the first target RAT to which the mobile terminal is to change to be co-located with a serving cell of the serving RAT, based on the channel quality indicator (CQI) of the serving RAT being better than the target cell of the first target RAT.

6. The base station according to claim 4, wherein included in said function is further path loss of the serving cell in the serving RAT, path loss of the target cell in the first target RAT.

7. The base station according to claim 4, wherein the serving RAT pertains to Long Term Evolution, LTE, the first target RAT pertains to Universal Mobile Telecommunications System, UMTS, and the second target RAT pertains to Global System for Mobile Communication, GSM.

8. The method according to claim 1, wherein the CSFB service is needed for the mobile terminal to transmit/receive at least one of a voice call and a short messaging service (SMS).

* * * * *